(12) United States Patent
Gaia et al.

(10) Patent No.: US 11,365,652 B2
(45) Date of Patent: Jun. 21, 2022

(54) HIGH EFFICIENCY BINARY GEOTHERMAL SYSTEM

(71) Applicant: TURBODEN S. p. A., Brescia (IT)

(72) Inventors: Mario Gaia, Brescia (IT); Roberto Bini, Brescia (IT); Andrea Duvia, Brescia (IT)

(73) Assignee: TURBODEN, S.p.A., Brescia (IT)

( * ) Notice: Subject to any disclaimer, the term of this patent is extended or adjusted under 35 U.S.C. 154(b) by 612 days.

(21) Appl. No.: 16/304,767

(22) PCT Filed: May 24, 2017

(86) PCT No.: PCT/IB2017/053063
§ 371 (c)(1),
(2) Date: Nov. 27, 2018

(87) PCT Pub. No.: WO2017/203447
PCT Pub. Date: Nov. 30, 2017

(65) Prior Publication Data
US 2021/0222591 A1    Jul. 22, 2021

(30) Foreign Application Priority Data
May 27, 2016 (IT) .................. 102016000055006

(51) Int. Cl.
| | |
|---|---|
| *F01K 23/02* | (2006.01) |
| *F01K 25/08* | (2006.01) |
| *F03G 7/04* | (2006.01) |
| *F03G 4/00* | (2006.01) |

(52) U.S. Cl.
CPC .............. *F01K 23/02* (2013.01); *F01K 25/08* (2013.01); *F03G 4/001* (2021.08); *F03G 4/035* (2021.08); *F03G 7/04* (2013.01); *Y02E 10/10* (2013.01)

(58) Field of Classification Search
CPC .................................. F03G 7/04; Y02E 10/10
See application file for complete search history.

(56) References Cited

U.S. PATENT DOCUMENTS

| | | | |
|---|---|---|---|
| 5,440,882 A * | 8/1995 | Kalina ...................... | F03G 7/04 60/641.2 |
| 5,809,782 A * | 9/1998 | Bronicki ................... | F03G 7/04 60/641.2 |

(Continued)

*Primary Examiner* — Laert Dounis
(74) *Attorney, Agent, or Firm* — R. Ruschena Patent Agent, LLC

(57) ABSTRACT

A binary geothermal system comprising: —an organic Rankine cycle having at least one supply pump for feeding an organic working fluid, in liquid phase, of at least one heat exchanger for heating the organic working fluid until its transformation vapor phase and to its eventual overheating, an expansion turbine to expand the organic working fluid vapor, a condenser bringing in a liquid phase the organic working fluid, —a geothermal source comprising a geothermal liquid and a geothermal vapor, the organic working fluid is vaporized directly or indirectly through a flow of geothermal vapor in the heat exchanger and is preheated by a flow of geothermal liquid in a first pre-heater, and the organic working fluid is preheated also in a second preheater which exploits the thermal energy contained in a flow rate formed by the gas mixture and by the geothermal vapor fraction which is not condensed.

13 Claims, 12 Drawing Sheets

(56) References Cited

U.S. PATENT DOCUMENTS

| | | | | |
|---|---|---|---|---|
| 2007/0095065 A1* | 5/2007 | Kaplan | ............... | F01K 25/08 |
| | | | | 60/651 |
| 2012/0260655 A1* | 10/2012 | Kaplan | ............... | F01K 25/08 |
| | | | | 60/641.2 |
| 2014/0075938 A1* | 3/2014 | Bronicki | ............... | F03G 7/00 |
| | | | | 60/641.5 |
| 2014/0116046 A1* | 5/2014 | Hadianto | ............ | F01K 23/02 |
| | | | | 60/641.5 |
| 2015/0168022 A1* | 6/2015 | Takata | ............... | F01K 9/003 |
| | | | | 60/641.3 |
| 2015/0284262 A1* | 10/2015 | Bronicki | ............... | F03G 7/04 |
| | | | | 203/10 |

* cited by examiner

Fig. 1- PRIOR ART

HIGH EFFICIENCY BINARY GEOTHERMAL SYSTEM

BACKGROUND OF THE INVENTION

1. Field of the Invention

The present invention relates to a binary geothermal system with an organic Rankine cycle (hereinafter, also ORC) able to generate mechanical and/or electrical and/or power by using as a primary power source the heat coming from a geothermal source at medium-high enthalpy. Specifically, for a binary geothermal system a closed thermodynamic cycle is meant, which exchanges heat with a geothermal source.

In particular, the binary geothermal system with ORC cycle uses a geothermal source at relatively low temperatures, when compared to applications with biomass combustion or heat recovery from industrial processes.

2. Brief Description of the Prior Art

As is known, a geothermal source can be made of a geothermal flow either at the state of vapor or liquid or two-phase. Often in the latter case, the gas portion is separated from the liquid one by means of suitable separators, so as to realize exchangers which receive at the inlet a single-phase source; this simplifies and makes more reliable the size of the heat exchanger, for example the heat exchanger of an ORC system.

Furthermore the vapor coming from a geothermal source often also contains a significant non-condensable gas portion NCG (mainly made of carbon dioxide) which, once the heat exchange has been performed, are expelled into the atmosphere or compressed and delivered to re-injection wells. For example, U.S. Pat. No. 8,601,814 describes the way by which the portion of non-condensable gas and vapor failing to condense in the evaporators of the organic fluid, is collected and expelled into the atmosphere at the condenser fans.

An example of a binary geothermal system according to the known art, is shown in FIG. 1, whereas FIG. 2 shows the respective temperature-power diagram. As shown in the Figures, the organic liquid is vaporized in parallel in the heat exchangers or evaporators EV1 and EV2; the evaporation steps may optionally be carried out within the same pressure vessel. In some cases, the amount of geothermal vapor is sufficient to evaporate all the flow of organic fluid. In these cases, the evaporator EV2 is not present. In EV2, the organic fluid exchanges heat with a flow of a geothermal liquid B1. In EV1, the organic fluid vaporizes by exchanging heat with the geothermal vapor S1, which condenses along the exchanger. The vapor also contains a substantial amount of non-condensable gases, hence its condensation temperature does not occur at the constant temperature as shown in the graph of FIG. 2. As a matter of fact, the vapor by condensing decreases the partial pressure of the remaining vapor, by instead increasing the partial pressure of the non-condensable gases. The result in a temperature-power graph is a length with a significant curvature, which is the greater the greater is its content of incondensable substances. The outlet flow S2 from EV1 arrives to the separator SP where the liquid fraction is separated from the gaseous one. The liquid fraction S3 is pumped and mixed with a first geothermal liquid flow B2 forming a further geothermal liquid flow B3 which will preheat the organic fluid in the preheater PRE1. In an alternative solution, the flows B2 and S3 are used to preheat the organic fluid in different heat exchangers, which are placed in series or in parallel with each other, depending on the temperature reached at the output of the EV2 and EV1 evaporators respectively. The gaseous fraction S2 consisting of vapor and non-condensable gases, is expelled into the atmosphere or re-injected into the subsoil.

The organic vapor produced in EV1 and EV2 is conveyed to be expanded in one or more turbines and finally is condensed, in the specific case, with air condensers CON, but also of different types. In order to increase the efficiency of the cycle, as shown in FIG. 1, it is possible to use a regenerator REG which heats the organic fluid compressed by the pump PUMP, then subtracting heat to the vapor exiting from the turbine.

As shown in FIG. 2, starting from a total mass flow rate of the geothermal fluid equal to the sum of SI and BI, for example equal to 675 t/h, a cycle is obtained with a gross electrical efficiency equal to 19.5%, corresponding to a gross power of 23.5 MWel. These values were obtained by assuming to perform an isopentane cycle with turbine efficiency equal to about 90% and with ambient air at 20° C.; these assumptions are made for the sole purpose of generating a comparison with the solution of the present invention. The separate flow S4 in the separator SP and expelled into the atmosphere, however still contains a non-negligible amount of heat. If the flow S4 is introduced in a gas flow under pressure, it is possible to expand such flow in a dedicated turbine and get an additional amount of electric power. This is not always possible and in addition such flow is generally corrosive and encrusting, for which reason the turbine may suffer from frequent interruptions or failures.

There is therefore the need to overcome the aforementioned drawbacks through an innovative binary geothermal system.

SUMMARY OF THE INVENTION

Object of the present invention is therefore an innovative binary geothermal system in an organic Rankine cycle characterized by higher global efficiency and able to recover a greater thermal power from the geothermal source. The system according to the present invention is in fact provided with a further step of preheating the organic fluid using the geothermal vapor flow, which is separated from the liquid phase, and also contains a non-negligible amount of heat. Therefore, the solution according to the present invention allows to exploit such geothermal output vapor, as specified in the annexed independent claim.

The dependent claims indicate further details and advantageous aspects of the invention.

BRIEF DESCRIPTION OF THE DRAWINGS

The different ways of implementing the invention will now be described, by way of examples, with reference to the accompanying drawings in which.

DETAILED DESCRIPTION OF THE PREFERRED EMBODIMENTS

On the attached figures, a binary geothermal system 100 in an organic Rankine cycle for power generation from a geothermal source 20 is shown.

The Organic Rankine cycle circuit 10 comprises at least one supply pump PUMP for supplying an organic working fluid, in a liquid phase, at least one of heat exchanger, PRE1, EV1, EV2 to heat the organic working fluid up to its transformation into the vapor phase, and its possible overheating, an expansion turbine to expand the organic working fluid in a vapor phase and a condenser CON which returns in the liquid phase the organic working fluid.

Figure 2:
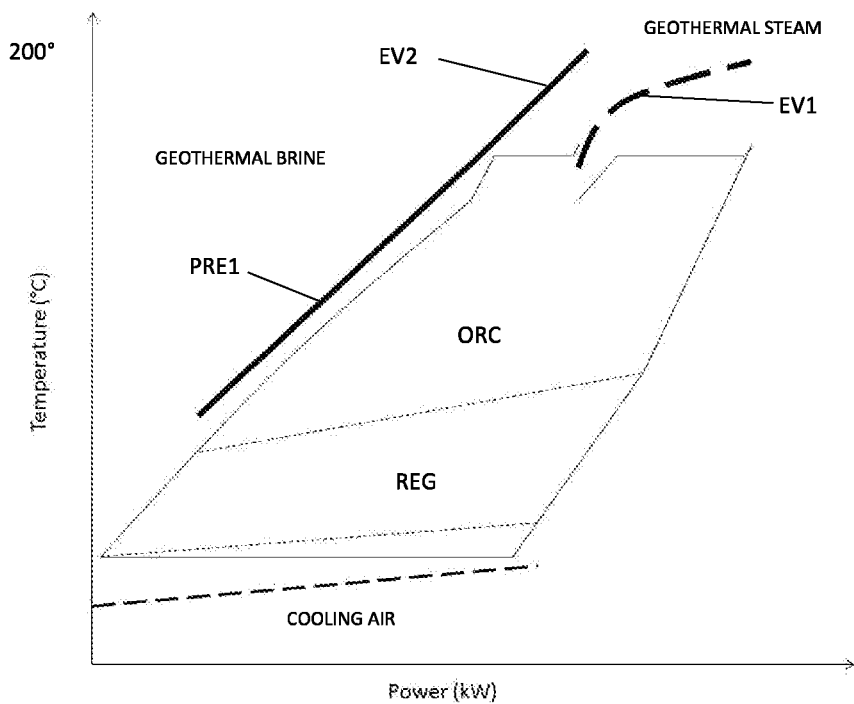
FIG. 2 shows the corresponding temperature graph-power of the system in FIG. 1.
Figure 3:
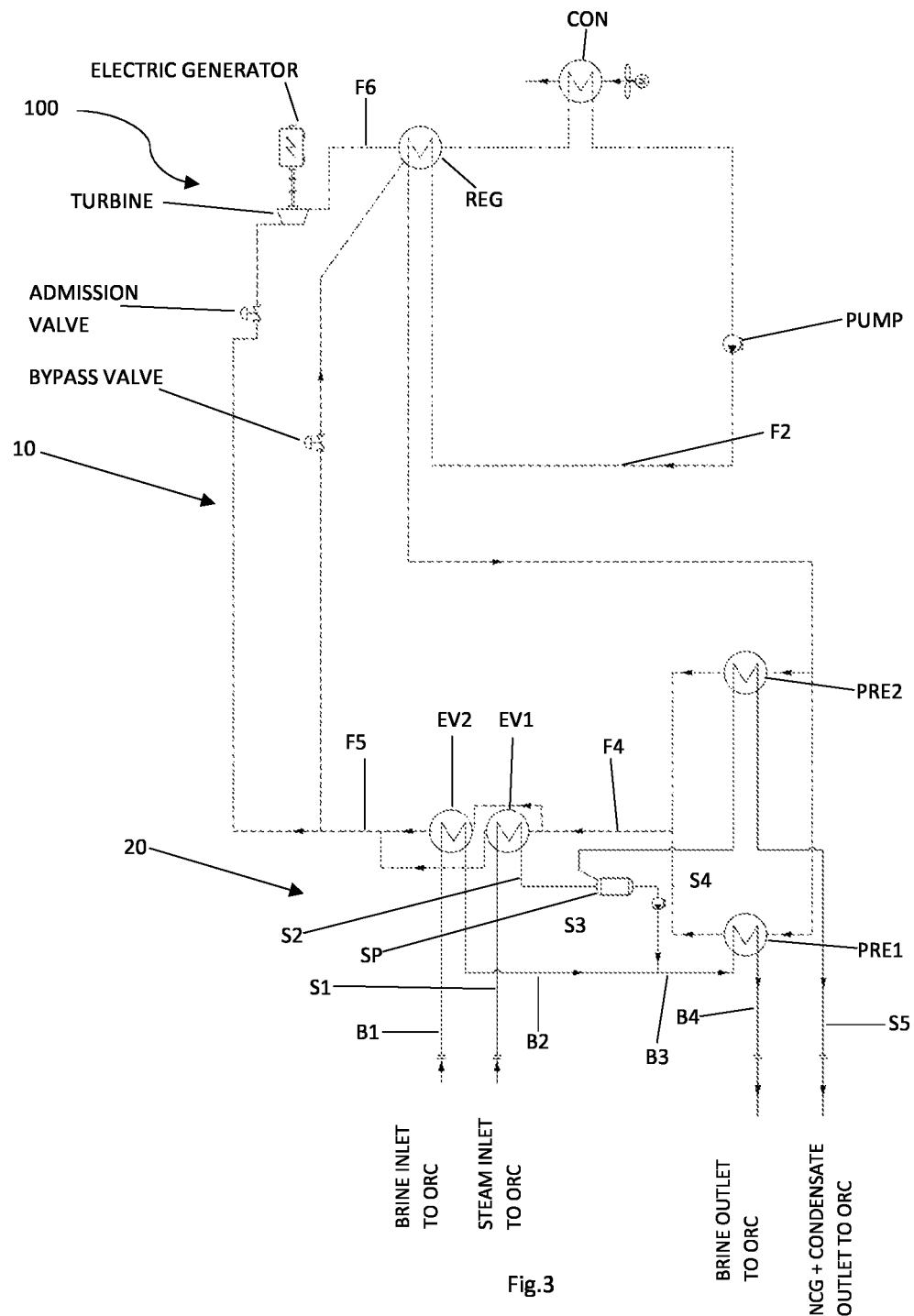
FIG. 3 shows an outline of a binary geothermal system in an organic Rankine cycle according to a first configuration of the present invention.
Figure 4:
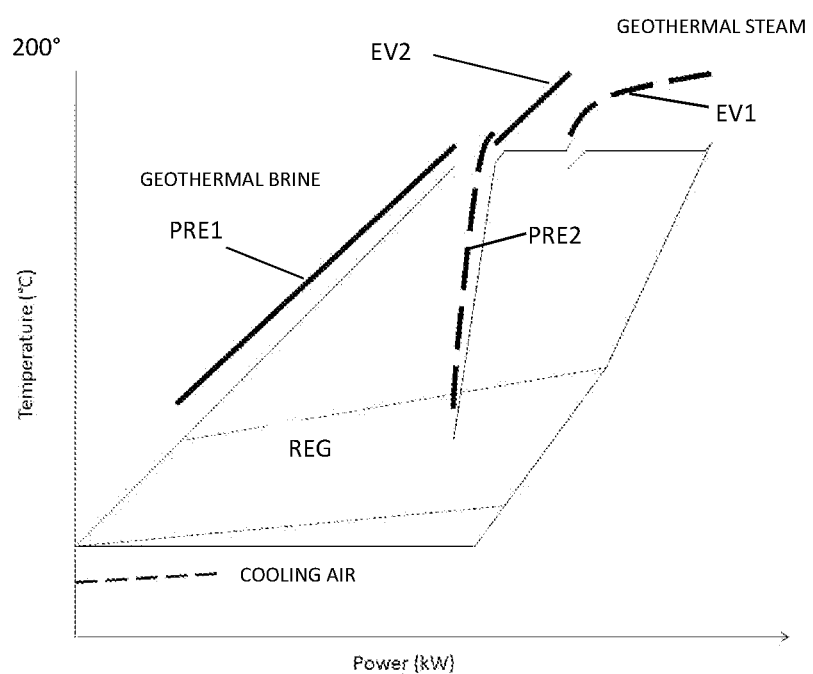
FIG. 4 shows the corresponding temperature-power graph of the system in FIG. 3.

As shown in FIG. 3, a further step of preheating the organic fluid using the flow S4 is integrated, coming from a separator SP, which still contains a not negligible amount of heat. When exiting the pre-heater PRE2 the geothermal flow S5 is discharged into the atmosphere. FIG. 4 shows a diagram of the trend of the temperature with respect to the power delivered. The organic fluid exiting from the regenerator REG is divided and preheated in parallel in the heat exchangers PRE1 and PRE2. Because the flowrate S4, S5 is markedly lower than the flowrate B3, to be able to preheat the working fluid at approximately the same way in the two pre-heaters, it is necessary that the flowrate of organic fluid in PRE2 is small, for this reason the corresponding curve in FIG. 4 has a high slope. As can be seen by comparing the graph of FIG. 4 relative to the system object of the present invention with that of FIG. 2 relative to the system of prior art, by considering the same geothermal source, the gross electric power achieved is equal to 24.9 MWel. Therefore, the solution in this patent permits to produce an additional 1.4 MWel, or an increase of 6% of the electric power. This result is mainly obtained thanks to the increase of the incoming thermal power, or 5.4 MW additional thermal values, which instead are dispersed into the atmosphere with the prior art solution. Even in this case it is supposed to make an isopentane cycle with a turbine performance equal to about 90% and with ambient air at 20° C.; these have been chosen for the sole purpose of generating a comparison between a known art system and a plant according to the present invention. These values must not be obviously considered restrictive, but serve only for comparative purposes. In addition to the advantage in terms of efficiency, a system according to the present invention enables to produce a certain amount of clean geothermal water, as a product of condensation of geothermal vapor, and therefore practically devoid of corrosive and encrusting substances present in the geothermal fluid extracted from the well. The flow S5 exiting the pre-heater PRE2 can pass through an additional separator, which divides the condensate gas from the non-condensable gases. These latter may be released into the atmosphere or compressed and reintroduced into the subsoil; the condensate can instead be used as reintegration water if condensers are used with evaporative towers, reducing the fresh water consumption of the system. Alternatively, the same condensate can be injected back into the subsoil together with the flowrate B4, increasing the recovery of the geothermal source and reducing the fouling problems that occur often in correspondence of the re-injection wells (this is because the flowrate B4 is diluted with a fluid flowrate free of corrosive and incrusting pollutants).

Figure 5:
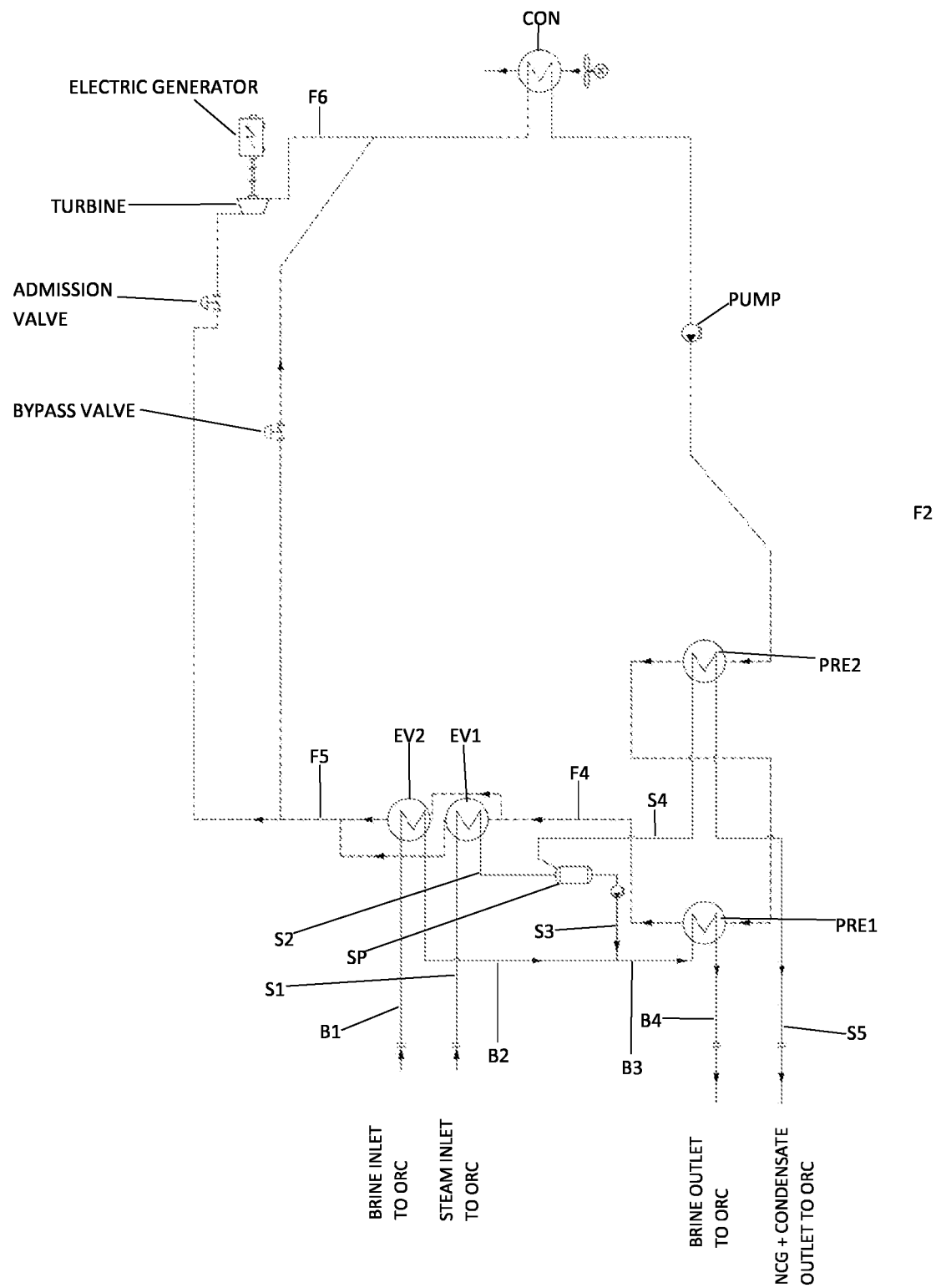
FIG. 5 shows an outline of a binary geothermal system in an organic Rankine cycle according to a second configuration of the present invention.

A second embodiment of the present invention is shown in FIG. 5 and is characterized by the fact that the pre-heater PRE2 is installed in series in PRE1. In this case, the flow S4 accomplishes the first length of preheating organic fluid and there is no internal regeneration of the ORC cycle, alternatively could also be adopted a similar configuration with regeneration. Without regeneration, the organic liquid phase begins preheating at a lower temperature, allowing a reduction of the output of the geothermal source temperature. In general, the presence of the regenerator increases the efficiency of the ORC cycle, but decreases the power that is possible to extract from the geothermal source. Sometimes, however, the geothermal fluid cannot be cooled below a certain temperature in order to avoid the depletion of the geothermal resource itself or to avoid formation of deposits that are formed primarily when the geothermal fluid falls below this temperature. In these cases, it is advisable to install the pre-heater PRE2 in series with PRE1, in particular immediately downstream of the organic fluid pump PUMP (or the regenerator, if present); while the power that can be extracted from geothermal water is limited by reasons previously exposed, and the residual fraction S4, in the gaseous state, can be cooled as much as possible and then used to carry out the first length of preheating in the pre-heater PRE2 of the organic fluid.

In addition, compared to the case with the regenerator, the pre-heater PRE2 could have lower exchange surfaces, and therefore size, thanks to a greater temperature difference between hot and cold flow (the organic liquid is located substantially at the condensation temperature).

Figure 6:
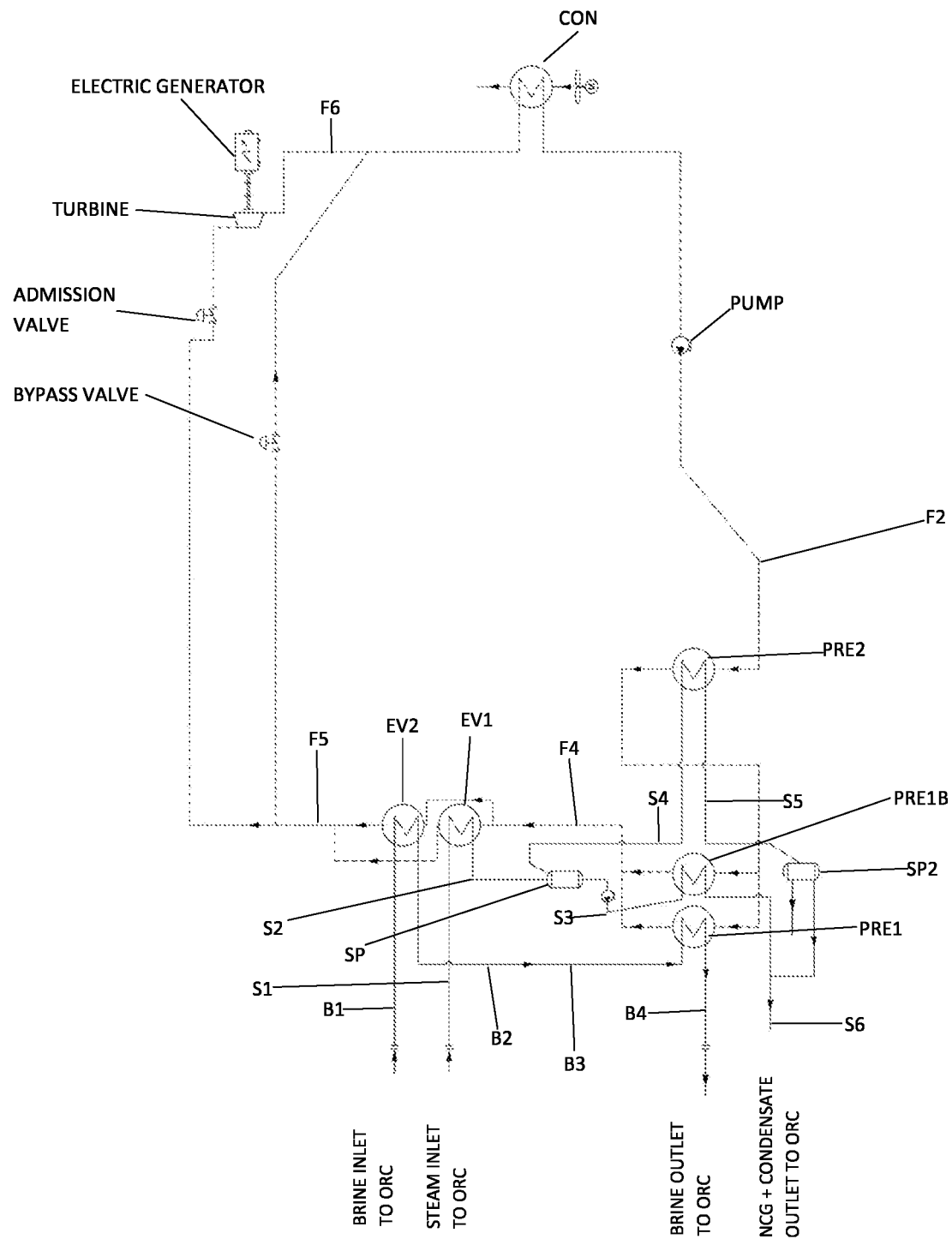
FIG. 6 shows an outline of a binary geothermal system in an organic Rankine cycle, according to a third configuration of the present invention.

A third embodiment of the present invention is shown in FIG. 6, which differs from the embodiment of FIG. 5, since the flows S3 and B2 are not mixed before entering the pre-heater PRE1, but they perform the preheating phase of the organic fluid in different heat exchangers, PRE1 and PRE1B respectively. This configuration is convenient when a greater flowrate of "clean" geothermal water for the recovery in the towers or for re-injection wells. The flowrate S3 exiting from PRE1B can be mixed with the liquid fraction separated by S5 in SP2, generating the geothermal flow S6.

Figure 7:
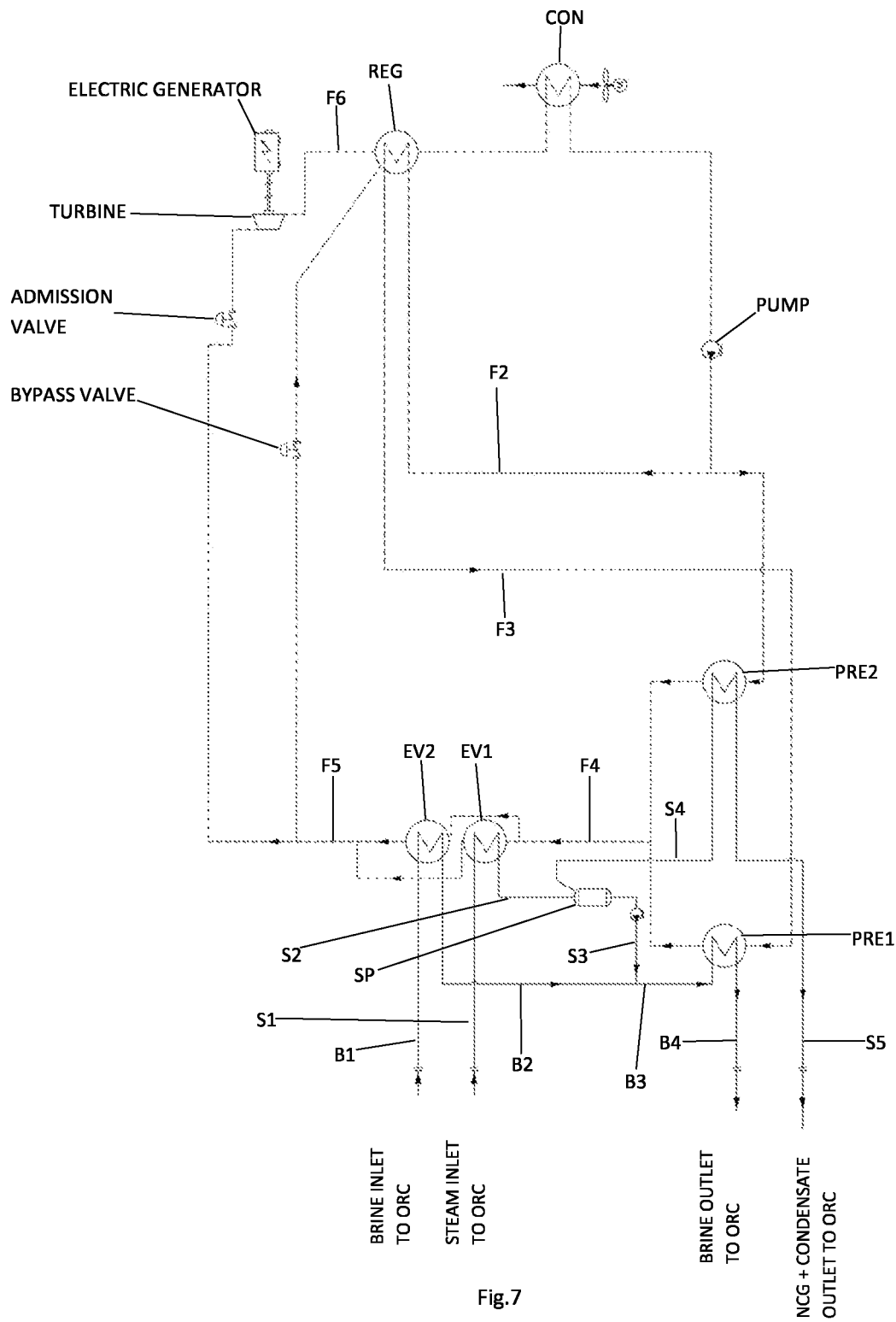
FIG. 7 shows an outline of a binary geothermal system in an organic Rankine cycle according to a fourth configuration of the present invention.

A fourth embodiment of the present invention is shown in FIG. 7, comprising the installation pre-heater PRE2 in parallel to the regenerator, so as to maintain at the same time a good cycle efficiency (thanks to the regenerator) and to increase the incoming power (the flow S4 is cooling at most thanks to the fact that the organic liquid is not yet regenerated). The organic fluid leaving the pre-heater PRE2 could then mix with the one exiting from the regenerator, before crossing the pre-heater PRE1, or the fluid exiting from the pre-heater PRE2 may be reunited with the organic fluid exiting from the pre-heater PRE1 (as shown in FIG. 7).

Figure 8:
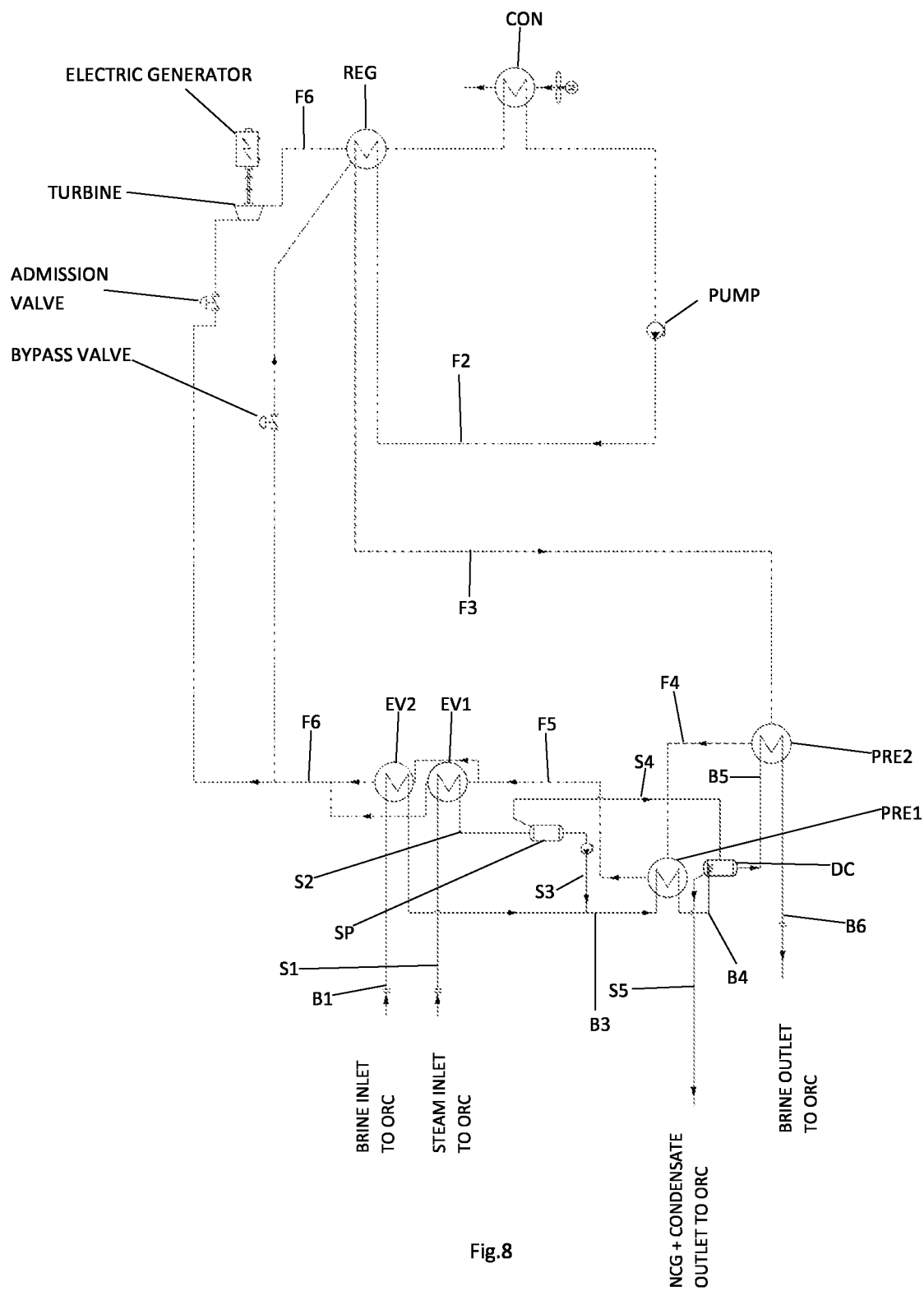
FIG. 8 shows an outline of a binary geothermal plant in an organic Rankine cycle according to a fifth configuration of the present invention.

A fifth embodiment is shown in FIG. 8, and it provides a direct contact heat exchanger DC, in which the residual vapor of the flow S4 is condensed through the direct exchange with an output of geothermal water at a lower temperature (the so-called direct contact condenser). The heat recovered from the vapor condensation will then be available for transferring to the organic fluid in the form of an increase of geothermal water temperature. This configuration involves dividing the pre-heating of the organic fluid into multiple pre-heaters in series. For example, by dividing the preheating in two pre-heaters PRE1 and PRE2 the direct contact condenser can be conveniently inserted between the pre-heaters PRE1 and PRE2. The temperature of the frost flow downstream of the pre-heater PRE1, namely a geothermal liquid flow B4, is increased through the condensation of the flow S4. The residual stream of non-condensable gas is ejected from the upper part of the condenser, namely the flow S5. The flow of geothermal water extracted from a lower part of the condenser, geothermal liquid flow B5, instead heats the organic fluid exiting from the regenerator or downstream of the pump in the case of plant without regenerator, in the PRE2 exchanger. The organic fluid flow F4 at the output of pre-heater PRE2 is sent to pre-heater PRE1 to complete the preheating.

Compared to the previously described configurations with surface direct pre-heaters between the organic fluid and the geothermal vapor, this configuration has the advantage that the exchanger PRE2 is very compact as the organic liquid exchanges heat with geothermal water; in previous configurations instead, in PRE2, the organic liquid exchanges with a gaseous flow mainly consisting of water vapor and C02. On the contrary, since the geothermal liquid is mixed with vapor, it is not possible to obtain clean condensate for a possible recovery of water to an evaporation tower.

Figure 9:
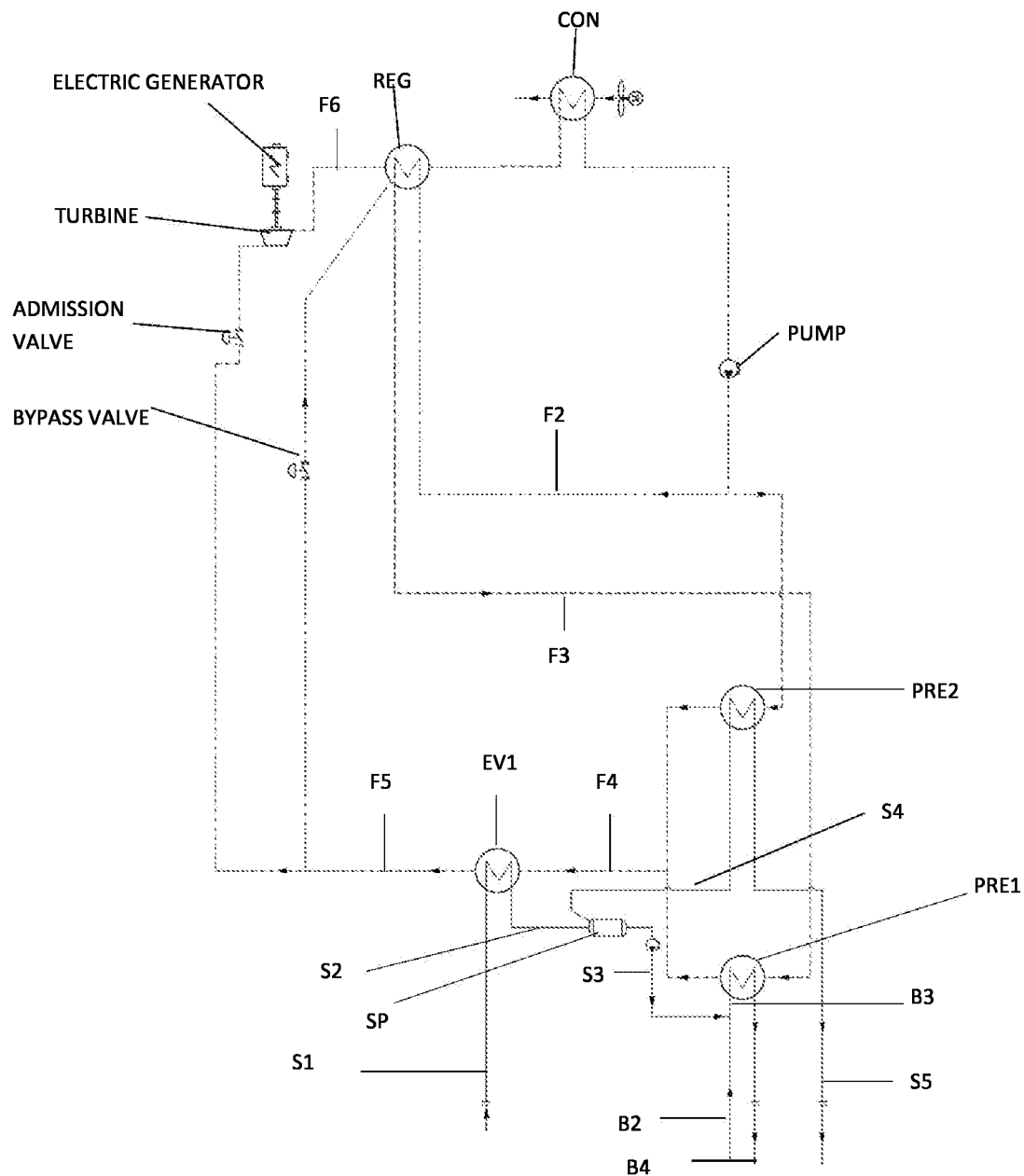
FIG. 9 shows an outline of binary geothermal system in an organic Rankine cycle according to a sixth configuration of the present invention.

A sixth embodiment is shown in FIG. 9, wherein the flow rate of geothermal vapor is high, and it is sufficient to evaporate and possibly overheat the organic fluid. The condensation of the geothermal vapor is separated from the remaining vapor/gaseous fraction in the separator SP and it is mixed with geothermal liquid flow BI to be preheated in the pre-heater PRE1. According to the present invention, even in this case it is possible to add a of preheating phase PRE2 in series or in parallel by exploiting the latent and sensible heat remaining in the separated gaseous fraction S4 in the separator SP.

Figure 10:
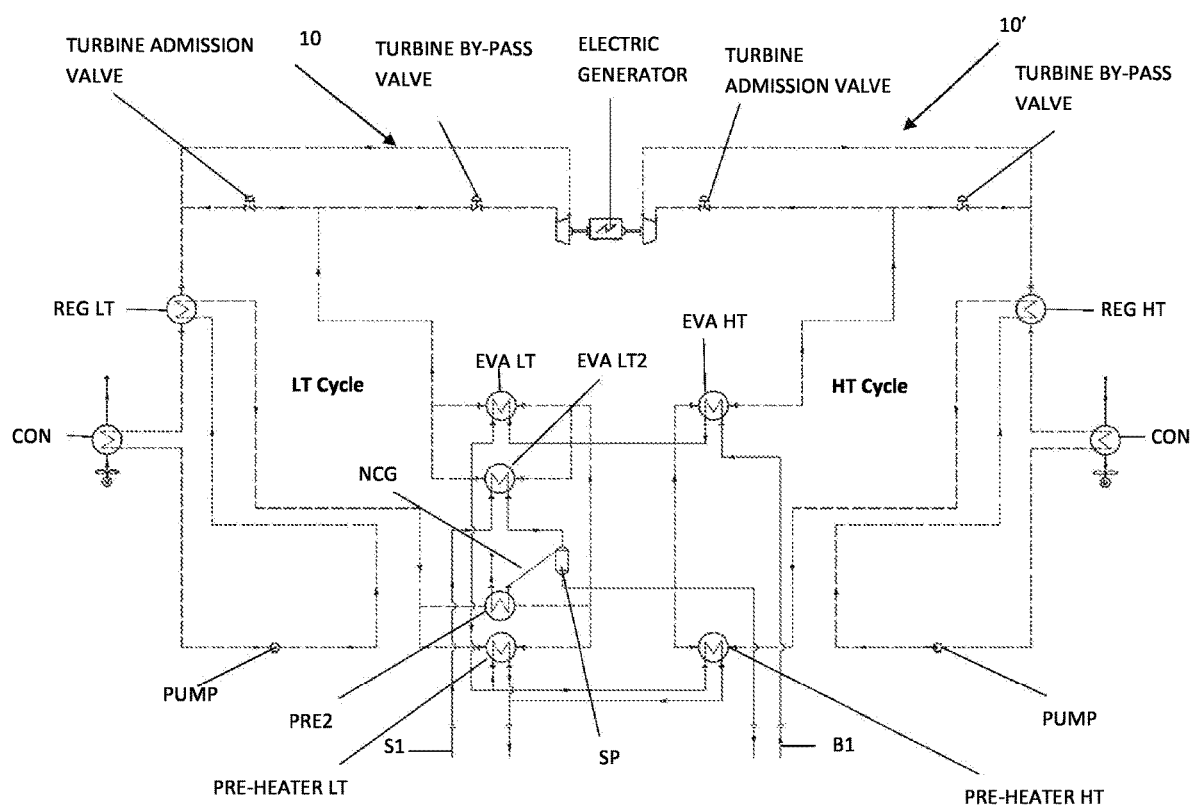
FIG. 10 shows an outline of geothermal system in an organic Rankine cycle according to a seventh configuration of the present invention.
Figure 11:
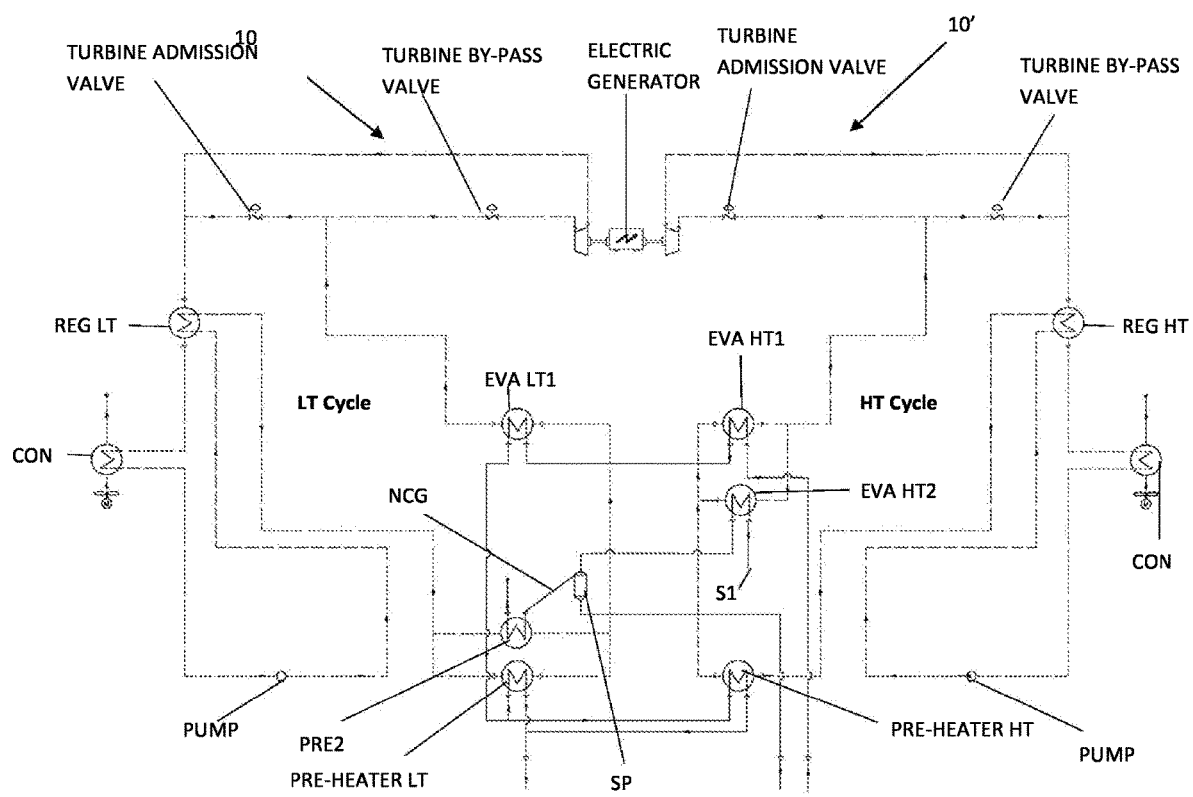
FIG. 11 shows an outline of a binary geothermal system in an organic Rankine cycle according to an eighth configuration of the present invention.

Additional configurations are shown in FIGS. 10 and 11, in which two bi-level ORC systems 10, 10' are presented, or characterized by two thermodynamic cycles at different levels of temperature and pressure. The high temperature cycles are indicated with HT, while those at low temperature with LT.

With reference to FIG. 10, the geothermal liquid flow BI enters the evaporator HT and subsequently in LT1, then divide and supply in parallel the pre-heaters LT and HT. The geothermal vapor feeds a second evaporator LT2, placed in parallel to the one fed with geothermal frost. The pre-heater PRE2 supplied with the not condensed vapor fraction and NCG, separated in the separator SP, is placed in parallel with the pre-heater LT, but could be positioned in series or in any other way already described for a monosystem level. If the temperature levels allow, alternatively, PRE2 can preheat the fluid of HT cycle.

In an alternative configuration, as shown in FIG. 11, the second evaporator of the low-temperature cycle is not present, but the geothermal vapor SI vaporizes the organic fluid of the HT cycle in a second evaporator EVA-HT2, placed in parallel to the first evaporator EVA-HT1.

Figure 1:
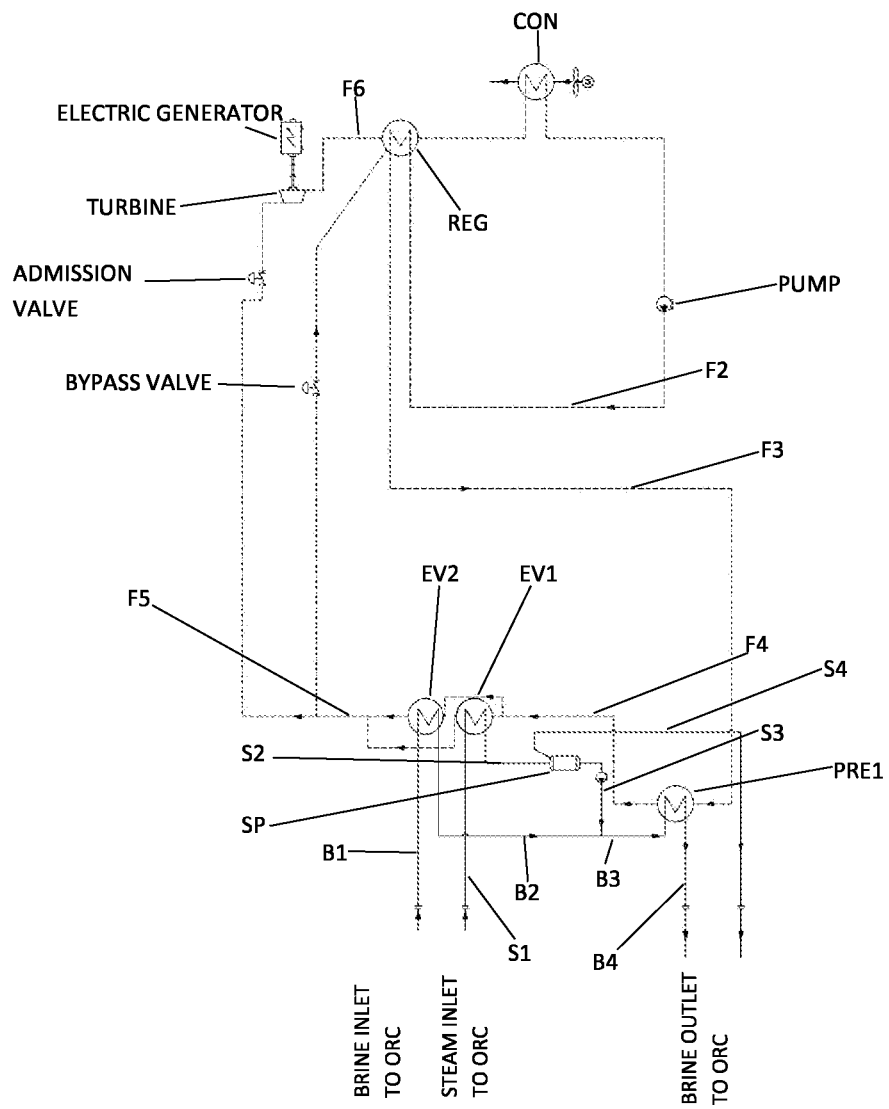
FIG. 1 shows an outline of a binary geothermal system in an organic Rankine cycle, according to the prior art.
Figure 12:
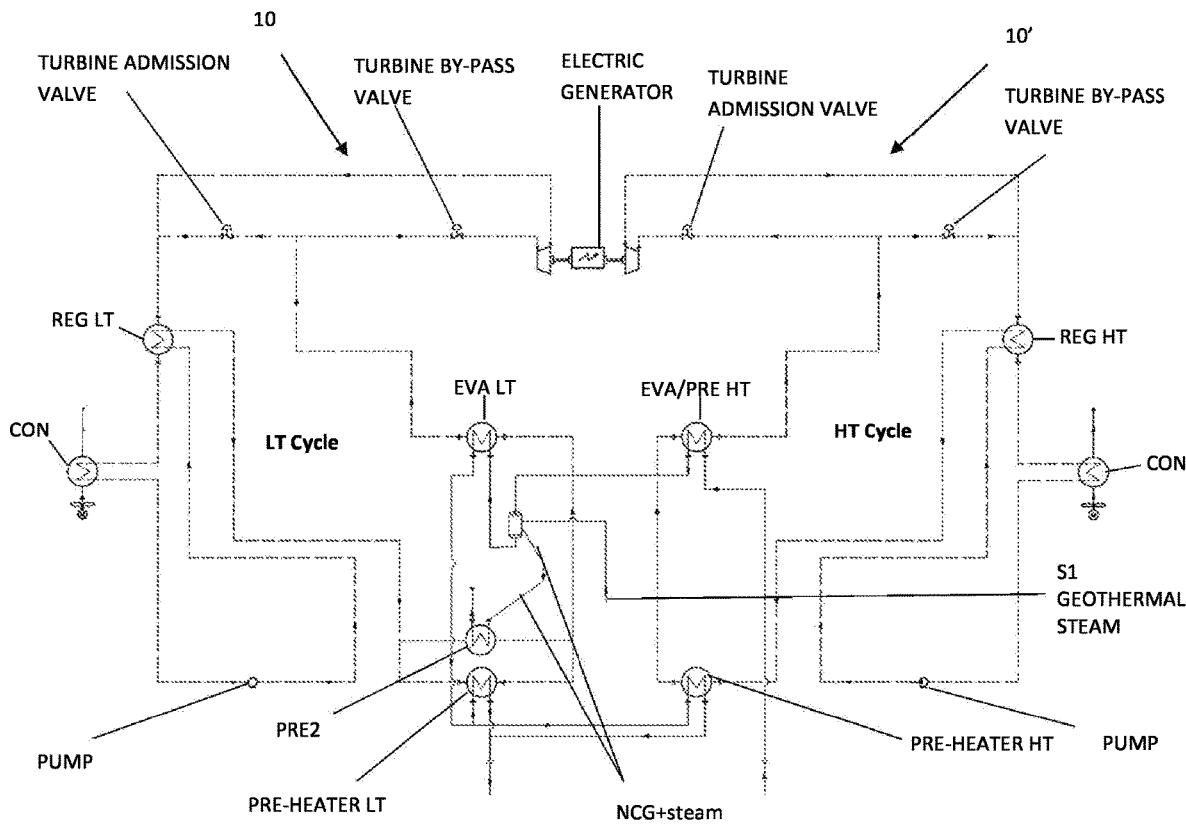
FIG. 12 shows an outline of binary geothermal system in an organic Rankine cycle according to a ninth configuration of the present invention.

The system in FIG. 12 mainly differs from that of FIG. 10 for the presence of a direct condenser DC on geothermal water circuit. The geothermal frost, after evaporating (or even preheating) the HT cycle fluid, is used to condense at least part of the geothermal vapor; in this way the resulting geothermal water is heated in the evaporator and proceeds LT (thus the flowrate SI indirectly contributes to the evaporation of the fluid of the cycle LT) and in the pre-heaters LT and HT as already described in FIG. 10. The fraction of NCG and vapor not condensed in the separator SP is used in a pre-heater PRE2 LT in the cycle LT (as in FIG. 1, 2) or HT, also in this case either in series or in parallel to the pre-heaters already present.

Although at least one exemplary embodiment has been presented in the summary description and in the detailed one, it must be understood that there is a large number of variants, falling within the scope of the invention. In addition, it should be understood that the embodiment or embodiments presented are only examples that do not intend to limit in any way the scope of the invention or its application or its configurations. Rather, the summary and the detailed description provide the person skilled in the field for a convenient guide to implement at least one exemplary embodiment, being well clear that numerous variants may be made in the function and assembly of the elements described herein without departing from the scope of protection of the invention, as set forth in the attached claims and their technical and legal equivalents.

The invention claimed is:
1. A binary geothermal system (100) comprising:
   at least one organic Rankine cycle (10) provided with at least a supply pump (PUMP) for supplying an organic working fluid, in liquid phase, to at least a heat exchanger (EV1) for heating the organic working fluid up to its transformation in vapor phase, an expansion turbine for expanding the organic working fluid in a vapor phase, a condenser (CON) which brings back the organic working fluid into a liquid phase,
   a geothermal source (20) comprising geothermal liquid and geothermal vapor wherein the organic working fluid is vaporized directly or indirectly through a flow (S1) of geothermal vapor in the heat exchanger (EV1) and is preheated by a geothermal liquid flow (B1) in a first pre-heater (PRE1), wherein said organic working fluid is also pre-heated in a second pre-heater (PRE2) that uses thermal energy contained in a flow (S4), constituted by a mixture of gas and by a fraction of geothermal vapor (S2) not condensed exiting from the heat exchanger (EV1) or from a further heat exchanger (DC);
   and wherein a second evaporator (EV2) has a first geothermal liquid flow (B2) exiting from it and wherein a liquid-vapor separator (SP) has a second geothermal liquid flow (S3) exiting from it;
   and wherein said first geothermal liquid flow (B2) and said second geothermal liquid flow (S3) are mixed to form a geothermal liquid flow (B3) that heats the organic working fluid in the first pre-heater (PRE1).

2. The system (100) according to claim 1, wherein said first pre-heater (PRE1) and said second pre-heater (PRE2) are in parallel in the at least one organic Rankine cycle (10).

3. The system (100) according to claim 1, wherein said first pre-heater (PRE1) and said second pre-heater (PRE2) are in series in the at least one organic Rankine cycle (10).

4. The system (100) according to claim 3, wherein said first pre-heater (PRE1) and said second pre-heater (PRE2) are configured so that the organic working fluid passes through the second pre-heater (PRE2) and soon after passes through the first pre-heater (PRE1).

5. The system (100) according to claim 1, wherein said at least one organic Rankine cycle (10) further comprises a regenerator of said organic working fluid.

6. The system (100) according to claim 5, wherein said second pre-heater (PRE2) is in parallel to the regenerator in the at least one organic Rankine cycle (10).

7. The system (100) according to claim 5, wherein said organic working fluid, exiting from the second pre-heater (PRE2), is mixed with the organic working fluid exiting from the first pre-heater (PRE1).

8. The system (100) according to claim 7, wherein said organic working fluid exiting from the second pre-heater (PRE2) is mixed with the organic working fluid exiting from the regenerator.

9. The system (100) according to claim 1, wherein said geothermal liquid flow (B1), before preheating the organic working fluid, passes through the second evaporator (EV2) positioned in parallel with the heat exchanger (EV1) in the at least one organic Rankine cycle (10).

10. The system (100) according to claim 1, wherein said second pre-heater (PRE2) has a fraction of geothermal liquid (S5) exiting from it;
and wherein a fraction of geothermal liquid (S6) is exiting from a further pre-heater (PRE1B); and wherein said fraction of geothermal liquid (S5) and/or said fraction of geothermal liquid (S6) are used as restoration water for evaporative cooling towers.

11. The system (100) according to claim 1 wherein said second pre-heater (PRE2) has a fraction of geothermal liquid (S5) exiting from said second pre-heater (PRE2) and wherein a fraction of geothermal liquid (S6) is exiting from a further pre-heater (PRE1B) and is sent to reinjection wells.

12. The system (100) according to claim 1, wherein the at least one organic Rankine cycle comprises a first organic Rankine cycle (10) and a second organic Rankine cycle (10'), said first organic Rankine cycle (10) is configured to operate at temperatures lower than the temperatures of the second organic Rankine cycle (10'), and the fraction of geothermal vapor exits from the liquid-vapor separator (SP) and is used to preheat the organic working fluid of one of the two organic Rankine cycles (10, 10').

13. The system (100) according to claim 12, wherein said second organic Rankine cycle (10') comprises a first evaporator (EVA-HT1) and a second evaporator (EVA-HT2), in parallel with each other, and the flow (S1) of geothermal vapor vaporizes the organic working fluid of the second organic Rankine cycle (10') in the second evaporator (EVA-HT2).

* * * * *